(12) United States Patent
Kim et al.

(10) Patent No.: US 8,918,132 B2
(45) Date of Patent: Dec. 23, 2014

(54) APPARATUS AND METHOD FOR PREVENTING EXCESSIVE SIGNALING OVERHEAD WHILE A GROUP COMMUNICATION IS PERFORMED IN A BROADBAND WIRELESS ACCESS SYSTEM

(75) Inventors: Gyou-Hwan Kim, Suwon-si (KR); Jai-Jin Lim, Seoul (KR); Sang-Hoon Ryu, Seoul (KR); Jun-Hwan Oh, Seongnam-si (KR); Woo-Jae Kim, Suwon-si (KR); Sung-Kwan Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 487 days.

(21) Appl. No.: 13/292,411

(22) Filed: Nov. 9, 2011

(65) Prior Publication Data

US 2012/0115530 A1 May 10, 2012

(30) Foreign Application Priority Data

Nov. 9, 2010 (KR) .................. 10-2010-0110842

(51) Int. Cl.
*H04W 4/10* (2009.01)
*H04W 76/00* (2009.01)
(52) U.S. Cl.
CPC .............. *H04W 76/005* (2013.01); *H04W 4/10* (2013.01)
USPC .......................................... 455/518; 455/520

(58) Field of Classification Search
None
See application file for complete search history.

(56) References Cited

U.S. PATENT DOCUMENTS

2006/0223563 A1  10/2006 Sung et al.
2008/0160906 A1* 7/2008 Ranjan et al. ................ 455/3.01

FOREIGN PATENT DOCUMENTS

KR  10-2006-0098889 A  9/2006
KR  10-2007-0104079 A  10/2007

* cited by examiner

*Primary Examiner* — Philip Sobutka
(74) *Attorney, Agent, or Firm* — Jefferson IP Law, LLP

(57) ABSTRACT

An apparatus and a method for setting a group communication session using a wireless access system are provided. The method includes transmitting, at a transmission side client, a message requesting start/end of group communication to a control Push To Talk (PTT) server, transmitting, at the control PTT server, a session set/end message including a sequence number to a participating PTT server, multicasting, at the participating PTT server, a connect/disconnect request message N times for at least one reception side client, and setting/releasing, at the at least one reception side client, a session for the group communication.

28 Claims, 6 Drawing Sheets

APPARATUS AND METHOD FOR PREVENTING EXCESSIVE SIGNALING OVERHEAD WHILE A GROUP COMMUNICATION IS PERFORMED IN A BROADBAND WIRELESS ACCESS SYSTEM

This application claims the benefit under 35 U.S.C. §119 (a) of a Korean patent application filed in the Korean Intellectual Property Office on Nov. 9, 2010 and assigned Ser. No. 10-2010-0110842, the entire disclosure of which is hereby incorporated by reference.

BACKGROUND OF THE INVENTION

1. Field of the Invention

The present invention relates to a broadband wireless access system. More particularly, the present invention relates to an apparatus and a method for signaling of a connect/disconnect message during group communication in a broadband wireless access system.

2. Description of the Related Art

As a communication system develops, a broadband wireless access system can provide various kinds of services with a high transmission rate. Accordingly, research for providing various additional services as well as one-to-one telephone communication, which is the general communication of the related art, via the broadband wireless access system is in progress. For example, a group communication, specifically, a Push To Talk (PTT) service via the broadband wireless access communication system is considered. As one of standardization activities for the PTT service, the Open Mobile Alliance (OMA), which is an organization establishing an open type standard used in a mobile communication terminal, proposes an OMA PTT over Cellular (PoC) standard for the PTT service.

According to the OMA PoC standard, after a session is pre-established, a PTT terminal transmits a REFER message to a control PoC server in order to communicate. Accordingly, a participating PoC server receives an INVITE message from the control PoC server, transmits a Media Burst Control Protocol (MBCP) connect message to a counterpart PTT terminal in a unicast method, and receives a MBCP Media Burst Acknowledgement message from the counterpart PTT terminal.

At this point, in the case where the control PoC server transmits a plurality of INVITE messages using the same RFFER message, since the MBCP Connect message is doubly transmitted in a unicast method by the number of the INVITE messages, an excessive signaling overhead occurs. Similarly, an MBCP disconnect message is also doubly transmitted in a unicast method by the number of BYE messages.

In addition, when the counterpart PTT terminal operates in an idle mode in a wireless access network, the counterpart PTT terminal that has received the MBCP connect message has to make a transition to an awake mode in order to transmit the MBCP Media Burst Acknowledgement message. Accordingly, when a plurality of terminals serving as objects of group communication are in an idle mode, paging signaling for allowing the plurality of terminals to make a transition to the awake mode from the idle mode and signaling for exiting the idle mode occur excessively, and as a result, a system overload and a communication delay occur. Furthermore, since the number of terminals operable in an awake mode in a wireless access network is limited, the number of terminals that can simultaneously perform group communication is limited by the number of the terminals operable in the awake mode.

Therefore, in performing group communication using a broadband wireless access system, there is a need for an apparatus and a method for preventing occurrence of an excessive signaling overhead by an awake mode entry.

SUMMARY OF THE INVENTION

Aspects of the present invention are to address at least the above-mentioned problems and/or disadvantages and to provide at least the advantages described below. Accordingly, an aspect of the present invention is to provide an apparatus and a method for preventing occurrence of an excessive signaling overhead by an awake mode entry while group communication is performed in a broadband wireless access system.

Another aspect of the present invention is to provide an apparatus and a method for overcoming a limitation in the number of group communication users caused by a limitation in the number of terminals operable in an awake mode while group communication is performed in a broadband wireless access system.

In accordance with an aspect of the present invention, a method for managing a group communication session based on a wireless access system is provided. The method includes transmitting, at a transmission side client, a message requesting start/end of group communication to a control Push To Talk (PTT) server, transmitting, at the control PTT server, a session set/end message including a sequence number to a participating PTT server, the sequence number being intended for discriminating a start/end request for group communication that has generated the secession set/end message, and session set/end messages generated by a start/end request for one group communication having the same sequence number, multicasting, at the participating PTT server, a connect/disconnect request message N times for at least one reception side client, N being an integer equal to or greater than 1, and setting/releasing, at the at least one reception side client, a session for the group communication.

In accordance with another aspect of the present invention, a method for operating a control PTT server for managing a group communication session based on a wireless access network is provided. The method includes, when a message requesting at least one reception side terminal to start/end group communication is received from a transmission side terminal, transmitting session set/end messages including the same sequence number by the number of the reception side terminals to a participating PTT server, receiving a confirm message from the participating PTT server, and transmitting a connect/disconnect request message to the transmission side terminal In accordance with still another aspect of the present invention, a method for operating a participating PTT server for managing a group communication session based on a wireless access network is provided. The method includes, when a session set/end message is received from a control PTT server, determining whether a sequence number of a previously received session set/end message is the same as a sequence number of the session set/end message, when the sequence numbers are the same, discarding the session set/end message, and when the sequence numbers are not the same, multicasting a connect/disconnect request message for at least one reception side terminal In accordance with yet another aspect of the present invention, a method for operating a terminal for managing a group communication session based on a wireless access network is provided. The method includes receiving a connect/disconnect request message for setting/ending a group communication session from a PTT server, and setting/releasing the group communication session without transmitting a separate response message.

In accordance with further another aspect of the present invention, an apparatus of a control PTT server for managing a group communication session based on a wireless access network is provided. The apparatus includes a controller for, when a message requesting at least one reception side terminal to start/end group communication is received from a transmission side terminal, generating session set/end messages including the same sequence number by the number of reception side terminals, and a communication unit for, when a confirm message is received from a participating PTT server after transmitting at least one session set/end message to the participating PTT server, transmitting a connect/disconnect request message to the transmission side terminal.

In accordance with yet another aspect of the present invention, an apparatus of a participating PTT server for managing a group communication session based on a wireless access network is provided. The apparatus includes a communication unit for receiving a session set/end message from a control PTT server, and a controller for determining whether a sequence number of a previously received session set/end message is the same as a sequence number of the session set/end message, when the sequence numbers are the same, for discarding the session set/end message, and when the sequence numbers are not the same, for multicasting a connect/disconnect request message for at least one reception side terminal.

In accordance with another aspect of the present invention, an apparatus of a terminal for managing a group communication session based on a wireless access network is provided. The apparatus includes a modem for receiving a connect/disconnect request message for setting a group communication session from a PTT server, and a controller for setting/releasing the group communication session without transmitting a separate response message.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Exemplary embodiments of the present invention provide an apparatus and a method for signaling of a connect/disconnect message during group communication in a broadband wireless access system.

FIGS. 1 through 6, discussed below, and the various exemplary embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the invention. Terms first, second, and the like are used to differentiate between objects having the same terminology and are in no way intended to represent a chronological order, unless where explicitly stated otherwise. A set is defined as a non-empty set including at least one element.

Figure 1:
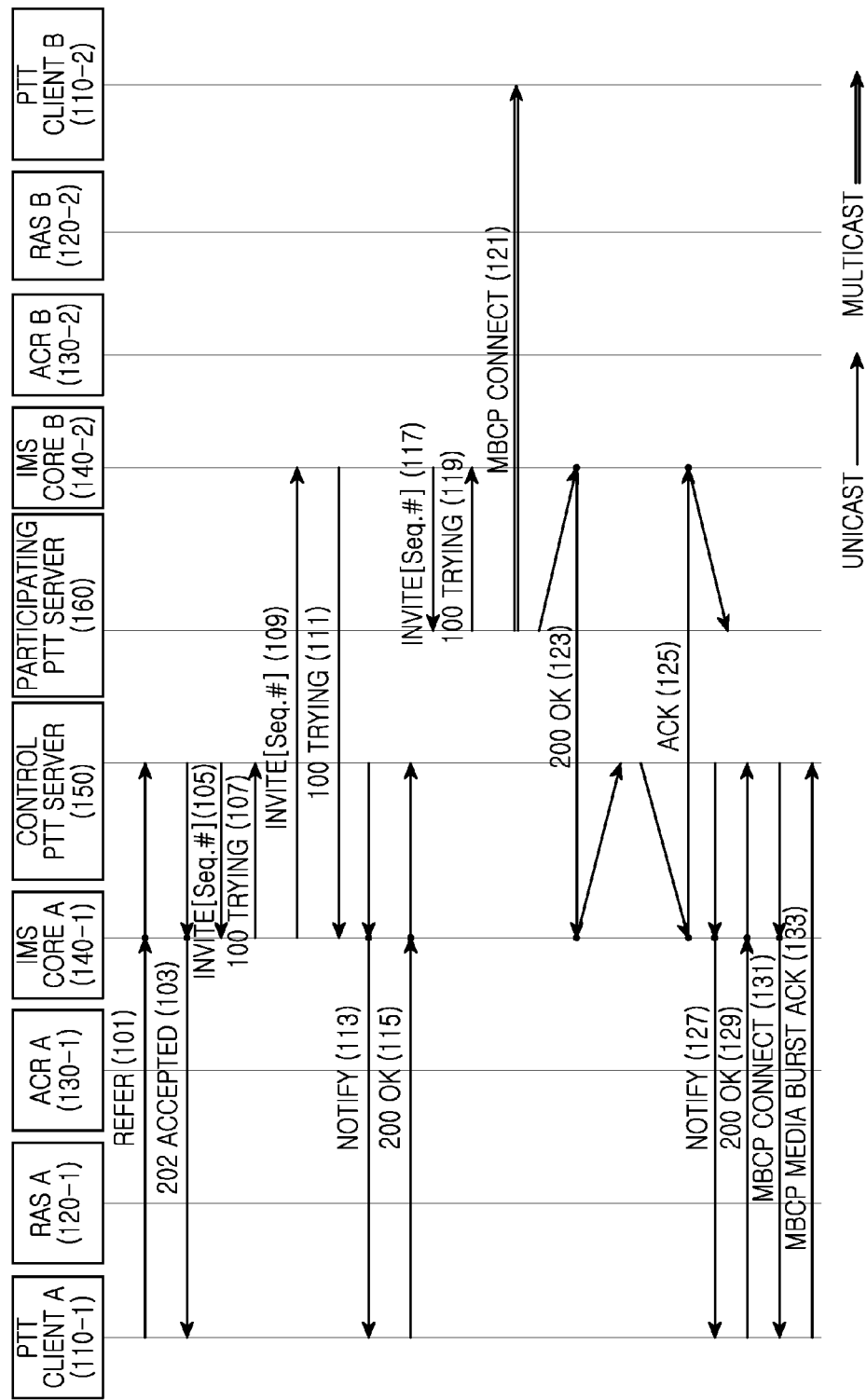
FIG. 1 is a view illustrating a signaling procedure for group communication connection in a broadband wireless access system according to an exemplary embodiment of the present invention.

FIG. 1 is a view illustrating a signaling procedure for group communication connection in a broadband wireless access system according to an exemplary embodiment of the present invention. FIG. 1 illustrates a signaling procedure of a Session Initiation Protocol (SIP)-based case. However, exemplary embodiments of the present invention are applicable to a case based on a different type session setting protocol.

Referring to FIG. 1, a signaling procedure between a Push To Talk (PTT) client_A 110-1, a PTT client_B 110-2, a Radio Access Station (RAS)_A 120-1, a RAS_B 120-2, an Access Control Router (ACR)_A 130-1, an ACR_B 130-2, an Internet protocol Multimedia Service (IMS) core_A 140-1, an IMS core_B 140-2, a control PTT server 150, and a participating PTT server 160 is illustrated. Though the procedure illustrated in FIG. 1 assumes only one transmitter terminal and only one receiver terminal, the procedure is applicable to a circumstance where a plurality of receiver terminals exist.

The PTT client_A 110-1 and the PTT client_B 110-2 are user equipments and perform communication with the RAS_A 120-1 and the RAS_B 120-2 via a radio channel, respectively. The RAS_A 120-1 and the RAS_B 120-2 allocate a radio resource to the PTT client_A 110-1 and the PTT client_B 110-2, and transmit/receive a signal in a unicast or multicast method via the allocated radio resource. The ACR_A 130-1 and the ACR_B 130-2 perform the function of a gateway of a wireless access network including RASs, and are responsible for mobility management and traffic management of the user equipments. The IMS core_A 140-1 and the IMS core_B 140-2 are objects performing the function of a proxy server for session setting signaling between a wireless communication network and a PTT server in order to support a multimedia service, such as voice, audio, video, and data based on an Internet Protocol (IP).

The control PTT server 150 is an object providing centralized PTT over Cellular (PoC) session handling. The PoC session handling of the control PTT server 150 includes Media distribution, Talk Burst Control, a Media Burst Control, policy enforcement for participation in the PoC Group Sessions, participant information, etc. The participating PTT server 160 is an object providing PoC session handling. The PoC session handling of the participating PTT server 160 includes policy enforcement for incoming PoC Sessions, and relays Talk Burst Control, and relay Media Burst Control messages between the PoC Client and the PoC server performing the PoC Function. In addition, the participating PTT server 160 may relay Realtime Transport Protocol (RTP) between the PoC client and the PoC server performing the PoC function.

In step 101, the PTT client_A 110-1 transmits a REFER message requesting start of group communication session setting to the control PTT server 150 via the IMS core_A 140-1 in order to start group communication. The REFER message includes identification information of a PTT group serving as an object of at least one group communication. The control PTT server 150 may know object clients via the identification information of the PTT group. More specifically, the PTT client_A 110-1 is allocated an uplink resource by the RAS_A 120-1, and transmits traffic including the REFER message via the uplink resource. Accordingly, the traffic is transferred to the ACR_A 130-1 via the RAS_A 120-1. The ACR_A 130-1 extracts the REFER message from the traffic, and transmits the REFER message to the control PTT server 150 via the IMS core_A 140-1.

In step 103, the control PTT server 150 that has received the REFER message transmits a 202 ACCEPTED message to the PTT client_A 110-1. The 202 ACCEPTED message is a message informing that a notifying side may normally process a subscribe request but acceptance for subscription has not been made in a framework for event notification using an SIP.

In step 105, the control PTT server 150 transmits an INVITE message to the IMS core_A 140-1. The INVITE message is a message requesting session setting and includes a sequence number (Seq. #). The sequence number is intended for discriminating a REFER message that generates the INVITE message. Therefore, in the case where the PTT client_A 110-1 transmits a REFER message requesting group communication to a plurality of counterpart clients, the control PTT server 150 transmits a plurality of INVITE messages including the same sequence number.

The IMS core_A 140-1 that has received the INVITE message transmits a 100 TRYING message to the control PTT server 150 in step 107. The 100 TRYING message is a message informing that transaction for processing the INVITE message is in progress.

In step 109, the IMS core_A 140-1 transmits an INVITE message to the IMS core_B 140-2.

The IMS core_B 140-2 that has received the INVITE message transmits a 100 TRYING message to the IMS core_A 140-1 in step 111. The 100 TRYING message is a message informing that transaction for processing the INVITE message is in progress.

In step 113, the control PTT server 150 transmits a NOTIFY message to the PTT client_A 110-1. The NOTIFY message is a message informing a progress state for a requested session. That is, the control PTT server 150 informs a setting progress status of a current group communication session using the NOTIFY message.

The PTT client_A 110-1 that has received the NOTIFY message transmits a 200 OK message to the control PTT server 150 in step 115. That is, the PTT client_A 110-1 informs the reception of the NOTIFY message via the 200 OK message.

In step 117, the IMS core_B 140-2 transmits an INVITE message to the participating PTT server 160. The INVITE message is a message requesting setting of a session and includes a sequence number (Seq. #). The sequence number is intended for discriminating a REFER message that generates the INVITE message. Therefore, the participating PTT server 160 determines the sequence number. When the sequence number is the same as the sequence number of the previously received INVITE message, the participating PTT server 160 discards the INVITE message and does not proceed with subsequent procedures. Here, an exemplary embodiment of the present invention assumes that the sequence number of the INVITE message is a new number.

The participating PTT server 160 that has received the INVITE message transmits a 100 TRYING message to the IMS core_B 140-2 in step 119. The 100 TRYING message is a message informing that transaction for processing the INVITE message is in progress.

In step 121, the participating PTT server 160 multicasts a Media Burst Control Protocol (MBCP) CONNECT message so that the PTT client_B 110-2 may receive the MBCP CONNECT message. The MBCP CONNECT message includes identification information of a PTT group and instructs the PTT client_B 110-2 to set a group communication session. Therefore, the PTT client_B 110-2 recognizes that group communication has been requested. More specifically, the participating PTT server 160 transmits an indicator indicating multicasting and the MBCP CONNECT message to the ACR_B 130-2, or transmits the MBCP CONNECT message to the ACR_B 130-2 using a multicast IP. Accordingly, the ACR_B 130-2 generates traffic including the MBCP CONNECT message, and transfers the traffic to the RAS_B 120-2. The RAS_B 120-2 multicasts traffic including the MBCP CONNECT message via a radio channel. Accordingly, even in an idle mode, the PTT client_B 110-2 may receive the MBCP CONNECT message without transition to an awake mode. At this point, since the PTT client_B 110-2 does not respond to the MBCP CONNECT message, the participating PTT server 160 may repeatedly transmit the MBCP CONNECT message two or more times to secure reliability of message transfer.

In step 123, the participating PTT server 160 transmits a 200 OK message to the control PTT server 150 via the IMS core_B 140-2 and the IMS core_A 140-1. The 200 OK message informs that a requested session has been set. The participating PTT server 160 that has transmitted the 200 OK message waits for reception of an ACK message.

In step 125, the control PTT server 150 that has received the 200 OK message transmits an ACK message to the participating PTT server 160 via the IMS core_A 140-1 and the IMS core_B 140-2. The ACK message is a message informing that the 200 OK message has been normally received.

In step 127, the control PTT server 150 transmits a NOTIFY message to the PTT client_A 110-1. The NOTIFY message is a message informing a progress state of a requested session. That is, the control PTT server 150 informs a setting progress status of current group communication using the NOTIFY message.

The PTT client_A 110-1 that has received the NOTIFY message transmits a 200 OK message to the control PTT server 150 in step 129. That is, the PTT client_A 110-1 informs reception of the NOTIFY message via the 200 OK message.

In step 131, the control PTT server 150 that has received the 200 OK message transmits an MBCP CONNECT message to the PTT client_A 110-1. In step 133, the PTT client_A 110-1 that has received the MBCP CONNECT message transmits an MBCP Media Burst Ack message to the control PTT server 150. That is, the PTT client_A 110-1 transmits the MBCP Media Burst Ack message in response to the MBCP CONNECT message.

FIG. 1 illustrates a message flow according to an exemplary embodiment of the present invention. A plurality of INVITE messages generated by the same REFER message transmitted by a PTT terminal include the same sequence number. When an INVITE message that triggers an MBCP CONNECT message includes the same sequence number, a participating PoC server prevents double transmission of an MBCP CONNECT message by transmitting an MBCP CONNECT message generated by a first INVITE message and discarding the remaining messages. Similarly, since a BYE message includes the same sequence number, a participating PoC server prevents double transmission of an MBCP disconnect message by transmitting an MBCP DISCONNECT message generated by a first BYE message and discarding the remaining messages.

The signaling procedure illustrated in FIG. 1 is a process for setting a session in order to start group communication. Together with the session setting process, an exemplary embodiment of the present invention is applicable to a process of ending a session. In the case of ending a session, a BYE message is used instead of an INVITE message, and an MBCP DISCONNECT message is used instead of an MBCP CONNECT message. In this case, the control PTT server 150 provides BYE messages including a sequence number to the participating PTT server 160. When receiving a BYE message including a different sequence number, the participating PTT server 160 broadcasts the MBCP DISCONNECT message. When receiving a BYE message including the same sequence number, the participating PTT server 160 discards the BYE message.

The control PTT server 150 and the participating PTT server 160 have been described as separate objects. However, the control PTT server 150 and the participating PTT server 160 may be included in one physical object.

Hereinafter, the operations and constructions of a PTT server and a terminal setting group communication are described.

Figure 2:
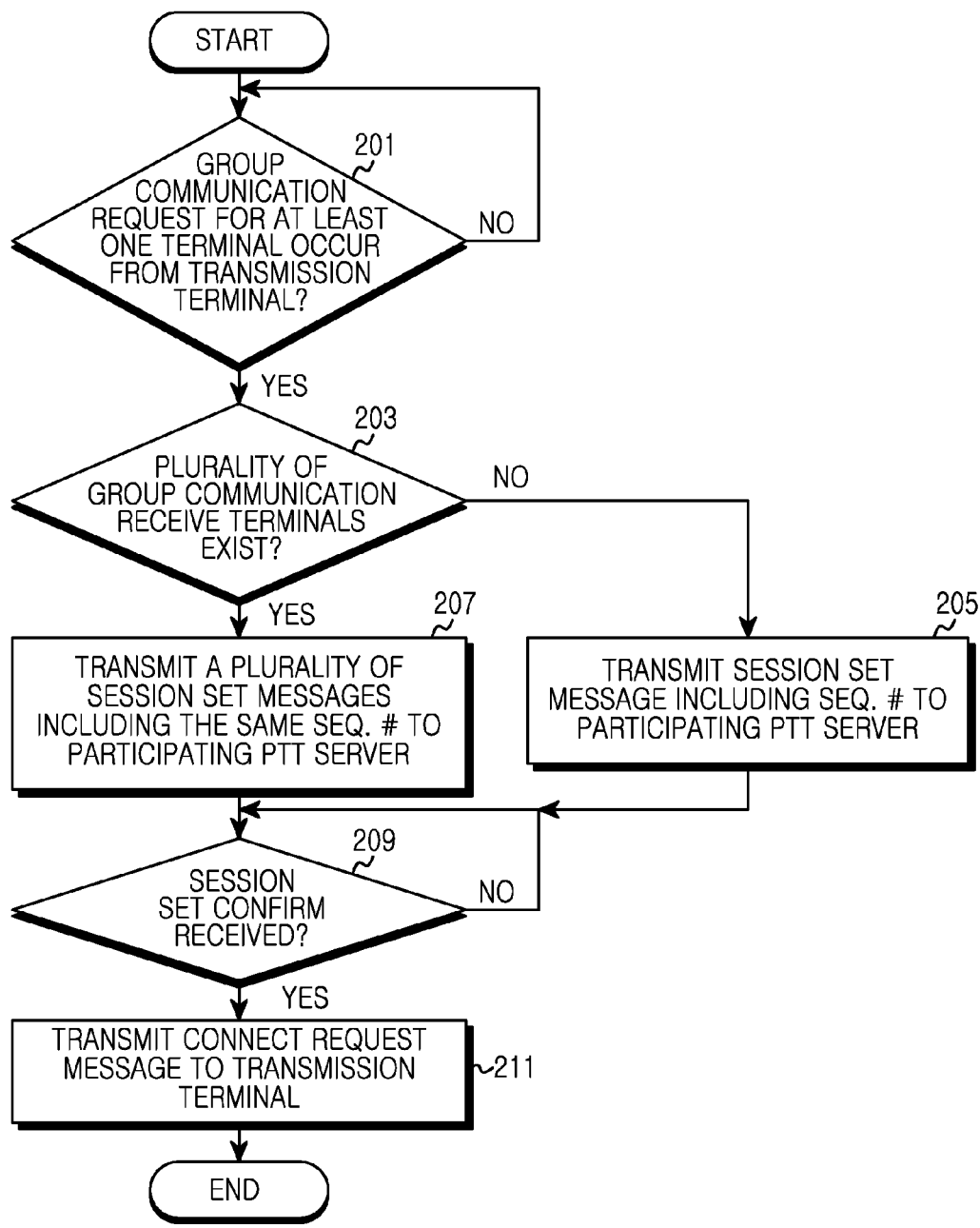
FIG. 2 is a flowchart illustrating a procedure for operating a control Push To Talk (PTT) server in a broadband wireless access system according to an exemplary embodiment of the present invention.

FIG. 2 is a flowchart illustrating a procedure for operating a control PTT server in a broadband wireless access system according to an exemplary embodiment of the present invention.

Referring to FIG. 2, the control PTT server determines whether a start request for group communication from a terminal to at least one different terminal occurs in step 201. Hereinafter, for convenience in description, a terminal requesting the group communication is denoted by a 'transmission terminal', and a terminal requested to perform the group communication is denoted by a 'reception terminal'. For example, in the case where a session is set based on an SIP, the start request for the group communication may be determined via reception of a REFER message including identification information of a relevant group.

When the start request for the group communication occurs, the control PTT server proceeds to step 203 to determine whether a plurality of reception terminals of the group communication exist. Though group communication is generally communication in which three or more terminals participate, communication of a group communication type may be performed for one reception terminal.

When the number of reception terminals of the group communication is one, the control PTT server proceeds to step 205 to transmit a session set message including a sequence number to a participating PTT server managing the relevant reception terminal. Here, the sequence number is intended for identifying a group communication request, and is set as a value greater than a sequence number included in a session set message by the previous group communication request. For example, in the case where a session is set based on an SIP, the session set message may be an INVITE message.

In contrast, when a plurality of reception terminals of group communication exist, the control PTT server proceeds to step 207 to transmit a plurality of session set messages including the same sequence number to a participating PTT server managing the relevant reception terminals. That is, the control PTT server represents that the plurality of session set messages have been generated by one group communication request by incorporating the same sequence number into the plurality of session set messages.

The control PTT server proceeds to step 209 to determine whether confirmation of group communication session setting is received from the participating PTT server. For example, in the case where a session is set based on an SIP, the confirmation may be a 200 OK message.

When the confirmation of the session setting is received, the control PTT server proceeds to step 211 to transmit a connect request message to the transmission terminal. For example, the connect request message may be an MBCP connect message.

The procedure illustrated in FIG. 2 is a procedure of operating the control PTT server in a process of setting a session in order to start group communication. Together with the session setting process, an exemplary embodiment of the present invention is applicable to a process of ending a session. In the case of ending a session, in the procedure illustrated in FIG. 2, the start request for the group communication is replaced by an end request for group communication, the session setting message is replaced by a session end message (for example, a BYE message), and the connect request message is replaced by a disconnect message (for example, an MBCP DISCONNECT message).

Figure 3:
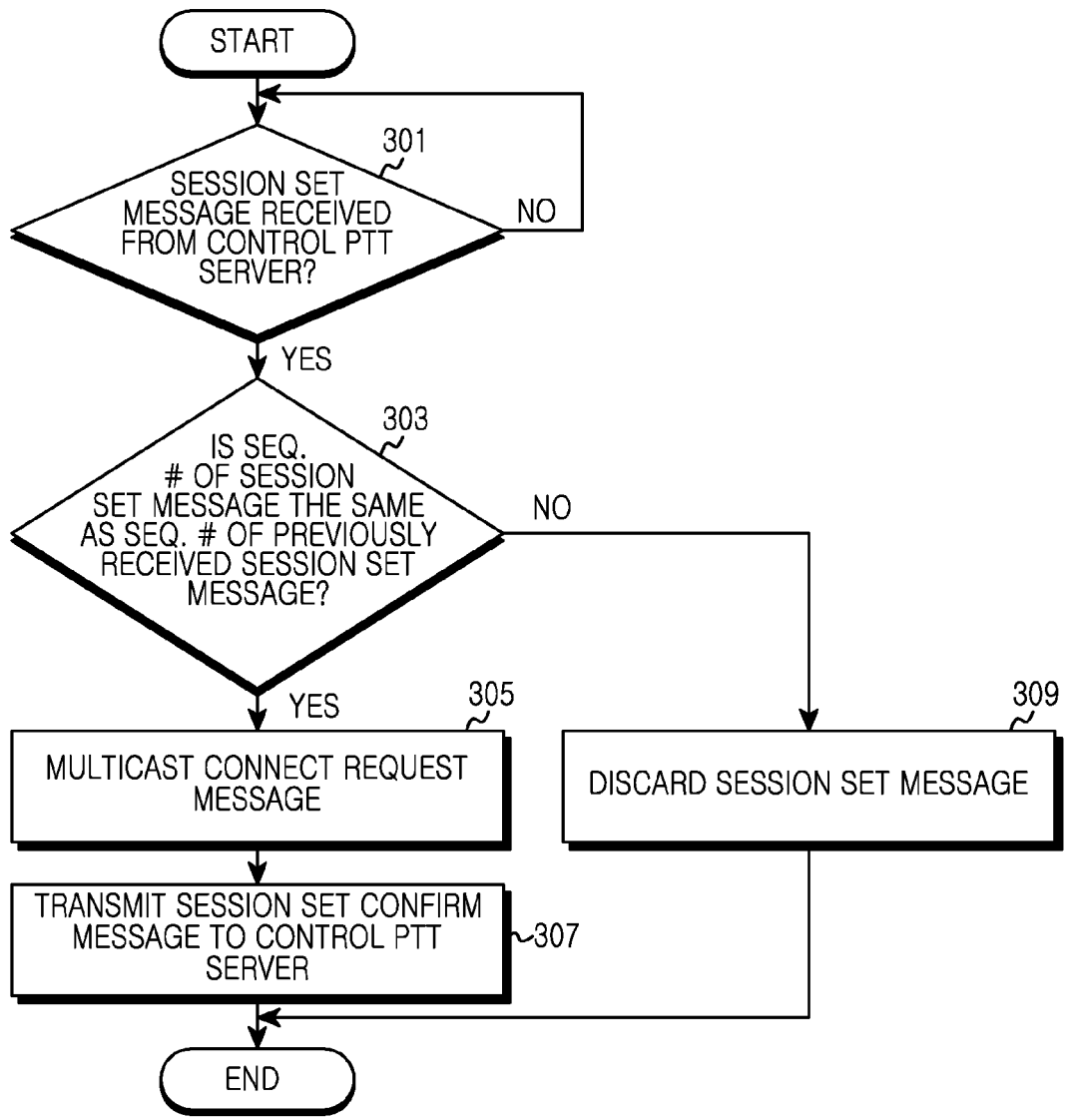
FIG. 3 is a flowchart illustrating a procedure for operating a participating PTT server in a broadband wireless access system according to an exemplary embodiment of the present invention.

FIG. 3 is a flowchart illustrating a procedure for operating a participating PTT server in a broadband wireless access system according to an exemplary embodiment of the present invention.

Referring to FIG. 3, the participating PTT server determines whether a session set message is received from a control PTT server in step 301. The session set message is a message requesting setting of a session for group communication and includes a sequence number. For example, in the case where a session is set based on an SIP, the session set message may be an INVITE message.

When the session set message is received, the participating PTT server proceeds to step 303 to determine whether a sequence number of the previously received session set message is the same as the sequence number of the session set message received in step 301. In other words, the participating PTT server determines whether the session set message including an increased sequence number has been received. Here, the sequence number is intended for identifying a group communication request, and is set as a value greater than a sequence number included in a session set message by the previous group communication request. That is, the participating PTT server determines whether the session set message received in step 301 has been generated by a new group communication request.

When the sequence number is the same, the participating PTT server proceeds to step 305 to multicast a connect request message. That is, the participating PTT server controls a base station to multicast the connect request message. At this point, the participating PTT server multicasts the connect request message N times. Here, N is an integer equal to or greater than 1. The participating PTT server adaptively determines a repetition frequency N with consideration of an environment, such as available resources, and may multicast the connect request message by the determined N times. For example, the connect request message may be an MBCP CONNECT message.

After multicasting the connect request message, the participating PTT server proceeds to step 307 to transmit a session set confirm message to the control PTT server. For example, in the case where a session is set based on an SIP, the confirm may be a 200 OK message.

In contrast, when the sequence number is not the same, the participating PTT server proceeds to step 309 to discard the session setting message. That is, the same sequence number denotes the participating PTT server has previously multicast a connect request message in response to reception of a session set message including the same sequence number, so that the participating PTT server does not doubly transmit the connect request message but discards the session set message.

The procedure illustrated in FIG. 3 is a procedure of operating a participating PTT server in a process of setting a session in order to start group communication. Together with the session setting process, an exemplary embodiment of the present invention is applicable to a process of ending a session. In the case of ending a session, in the procedure illustrated in FIG. 3, the session set message is replaced by a session end message (for example, a BYE message), and the connect request message is replaced by a disconnect message (for example, an MBCP DISCONNECT message).

Figure 4:
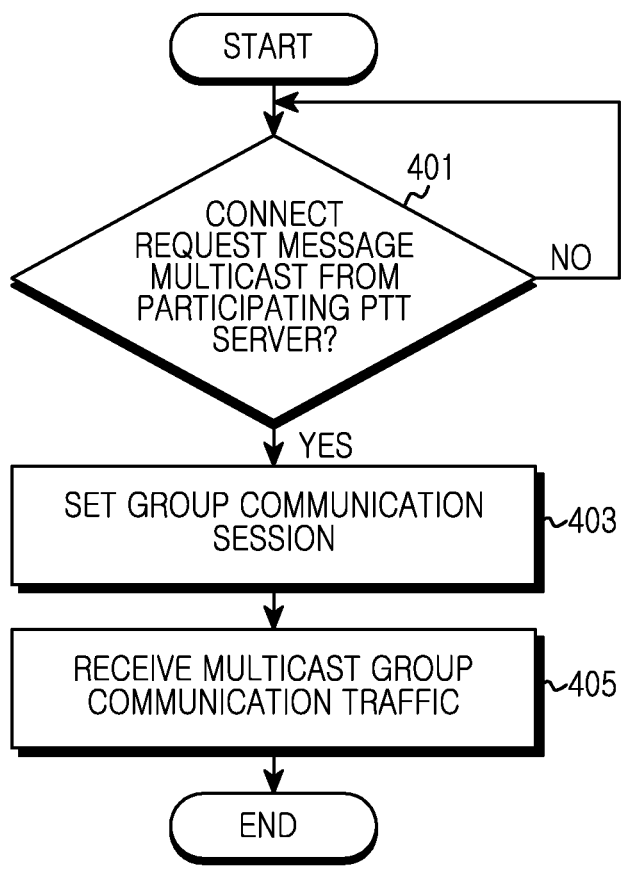
FIG. 4 is a flowchart illustrating a procedure for operating a group communication reception side terminal in a broadband wireless access system according to an exemplary embodiment of the present invention.

FIG. 4 is a flowchart illustrating a procedure for operating a group communication reception side terminal in a broadband wireless access system according to an exemplary embodiment of the present invention.

Referring to FIG. 4, the terminal determines whether a connect request message for group communication is multicast from a participating PTT server in step 401. The connect request message includes identification information for a group communication session. For example, the connect request message may be an MBCP CONNECT message.

When the connect request message is received, the terminal proceeds to step 403 to set a group communication session. At this point, in the case where the terminal operates in an idle mode in a wireless access network, the terminal receives the connect request message and sets a group communication session while maintaining the idle mode.

The terminal proceeds to step 405 to receive multicast group communication traffic. Here, the group communication traffic may be multicast periodically depending on a predefined time interval, or multicast without a predefined period. At this point, in the case where the terminal operates in the idle mode in a wireless access network, the terminal receives the group communication traffic while maintaining the idle mode.

The procedure illustrated in FIG. 4 is a procedure of operating a participating PTT server in a process of setting a session in order to start group communication. Together with the session setting procedure, an exemplary embodiment of the present invention is applicable to a process of ending a session. In the case of ending a session, in the procedure illustrated in FIG. 4, the connect request message is replaced by a disconnect message (for example, an MBCP DISCONNECT message), and the terminal releases a session in step 403, and ends the present procedure.

Figure 5:
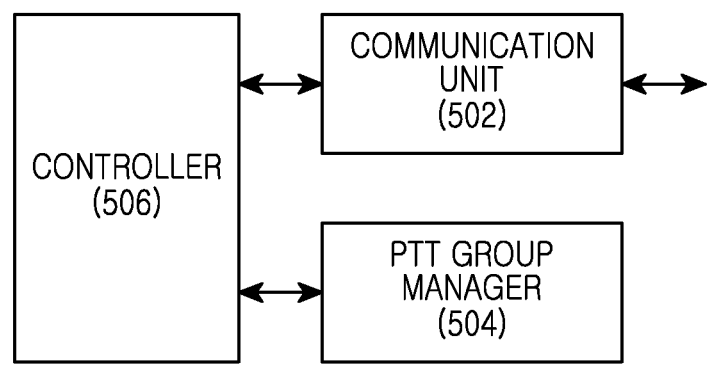
FIG. 5 is a block diagram illustrating a PTT server in a broadband wireless access system according to an exemplary embodiment of the present invention.

FIG. 5 is a block diagram illustrating a PTT server in a broadband wireless access system according to an exemplary embodiment of the present invention.

Referring to FIG. 5, the PTT server includes a communication unit 502, a PTT group manager 504, and a controller 506.

The communication unit 502 provides an interface for performing communication with other objects of a communication network. That is, the communication unit 502 converts data provided by the controller 506 into a physical signal and transmits the same, and converts a received physical signal into data and provides the same to controller 506.

The PTT group manager 504 stores information regarding a PTT group, that is, clients that have subscribed to group communication. Therefore, when a request for group communication occurs from a terminal, the PTT group manager 504 provides information regarding a counterpart of the group communication to the controller 506.

The controller 506 controls functions for handling a session of PTT group communication. For example, the controller 506 generates and reads messages for controlling group communication. For example, the controller 506 generates and reads a message requesting a counterpart PTT server to set a session, a message informing a progress status of session setting, a message requesting a terminal to set a session, etc. For example, the messages may be messages based on an SIP. In addition, the controller 506 controls functions, such as a Media distribution, a Talk Burst Control, a Media Burst Control, policy enforcement for participation in the PoC Group sessions, the Participant Information, relays Talk Burst Control, relays Media Burst Control messages between the PoC Client and the PoC server performing the PoC Function, etc. More particularly, the controller 506 controls a process of setting/ending a group communication session as follows.

In the case where the PTT server is a control PTT server, when a start/end request for group communication for at least one reception side terminal occurs from the transmission side terminal, the controller 506 transmits session set/end messages including the same sequence number by the number of the reception side terminals to a participating PTT server managing the relevant reception side terminals via the communication unit 502. Here, in the case where a session is set based on an SIP, the group communication request may be determined via reception of a REFER message including identification information of a relevant group. The session set message may be an INVITE message, and the session end message may be a BYE message. Thereafter, when a group communication session set/end confirm message is received from the participating PTT server, the controller 506 transmits a connect/disconnect request message to the transmission side terminal via the communication unit 502. For example, the connection request message may be an MBCP CONNECT message, and the disconnect request message may be an MBCP DISCONNECT message.

In the case where the PTT server is a participating PTT server, when a session set/end message including a sequence number is received from a control PTT server, the controller 506 determines whether a sequence number of the previously received session set message is the same as a sequence number of the session set/end message. That is, the controller 506 determines whether the session set/end message has been generated by a start/end request for a new group communication. When the sequence number is not the same, the controller 506 multicasts a connect/disconnect request message. At this point, the connect/disconnect request message may be multicast N times. Here, N is an integer equal to or greater than 1. In contrast, when the sequence number is the same, the controller 506 discards the session set/end message.

Figure 6:
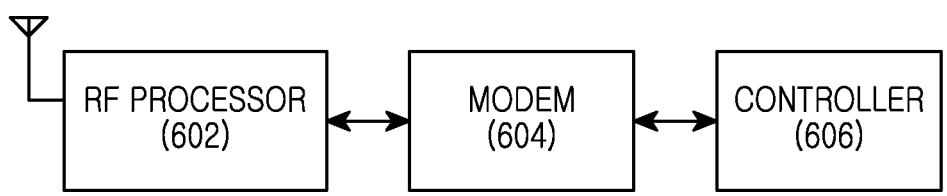
FIG. 6 is a block diagram illustrating a terminal in a broadband wireless access system according to an exemplary embodiment of the present invention.

FIG. 6 is a block diagram illustrating a terminal in a broadband wireless access system according to an exemplary embodiment of the present invention.

Referring to FIG. 6, the terminal includes a Radio Frequency (RF) processor 602, a modem 604, and a controller 606.

The RF processor 602 performs a function for transmitting/receiving a signal via an RF channel, such as band conversion and amplification of a signal. That is, the RF processor 602 up-converts a baseband signal provided from the modem 604 into an RF signal to transmit the same via an antenna, and down-converts an RF signal received via the antenna into a baseband signal.

The modem 604 performs a conversion function between a baseband signal and a bit line according to a physical layer standard of a wireless communication network. For example, according to an Orthogonal Frequency Division Multiplexing (OFDM) scheme, during data transmission, the modem 604 generates complex symbols by encoding and modulating a transmission bit line, maps the complex symbols to subcarriers, and configures OFDM symbols by performing Inverse Fast Fourier Transform (IFFT) and Cyclic Prefix (CP) insertion. In addition, during data reception, the modem 604 divides a baseband signal provided from the RF processor 602 on an OFDM symbol basis, recovers signals mapped to subcarriers by performing Fast Fourier Transform (FFT), and recovers a reception bit line via demodulation and decoding.

The controller 606 controls overall functions of the terminal. That is, the controller 606 processes data received via the RF processor 602 and the modem 604, and transmits traffic including user data or control messages via the modem 604 and the RF processor 602. More particularly, the controller 606 sets a session for group communication as follows.

When a connect/disconnect request message for group communication is multicast from a participating PTT server, the controller 606 sets/releases a group communication session without transmitting a separate response message. At this point, in the case where the terminal operates in an idle mode in a wireless access network, the controller 606 receives the connect/release request message and sets/releases a group communication session while maintaining the idle mode. In the case of setting the group communication session, the controller 606 receives multicast group communication traffic. Here, the group communication traffic may be multicast periodically depending on a predefined time interval, or multicast without a predefined period. At this point, in the case where the terminal operates in the idle mode in the wireless access network, the controller 606 receives the group communication traffic while maintaining the idle mode.

Exemplary embodiments of the present invention prevent double transmission of an MBCP CONNECT/DISCONNECT message occurring in the Open Mobile Alliance (OMA) PoC standard of the related art in a broadband wireless access system, and exclude an MBCP Media Burst Acknowledgement message so that an idle mode terminal may receive a message without making a transition to an awake mode, thereby reducing system overload due to excessive signaling and communication delay.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for managing a group communication session based on a wireless access system, the method comprising:
   transmitting, at a transmission side client, a message requesting start/end of group communication to a control Push To Talk (PTT) server;
   transmitting, at the control PTT server, a plurality of session set/end messages comprising a same sequence number to a participating PTT server, the same sequence number being used to identify the plurality of session set/end messages derived from a single start/end request for group communication;
   multicasting, at the participating PTT server, a connect/disconnect request message for a plurality of reception side clients, corresponding to the plurality of session set/end messages; and
   setting/releasing, at each of the plurality of reception side clients, a session for the group communication.

2. The method of claim 1, further comprising:
   multicasting, at the participating PTT server, the connect/disconnect request message at least one more time.

3. A method for operating a control Push To Talk (PTT) server for managing a group communication session based on a wireless access network, the method comprising:
   receiving a message requesting a plurality of reception side terminals to start/end group communication from a transmission side terminal;
   transmitting a plurality of session set/end messages comprising the same sequence number to a participating PTT server;
   receiving a confirm message from the participating PTT server; and
   transmitting a connect/disconnect request message to the transmission side terminal,
   wherein the sequence number is used to identify the plurality of session set/end messages derived from a single start/end request for group communication.

4. The method of claim 3, wherein the group communication session is managed based on a Session Initiation Protocol (SIP).

5. The method of claim 4, wherein the message requesting the start of the group communication comprises a REFER message.

6. The method of claim 4, wherein the session set message comprises an INVITE message and the session end message comprises a BYE message.

7. The method of claim 5, wherein the connect request message comprises a Media Burst Control Protocol (MBCP) connect message and the disconnect request message comprises an MBCP disconnect message.

8. A method for operating a participating Push To Talk (PTT) server for managing a group communication session based on a wireless access network, the method comprising:
receiving a plurality of session set/end messages comprising a same sequence number from a control PTT server;
multicasting a connect/disconnect request message for a plurality of reception side terminals corresponding to the plurality of session set/end messages,
wherein the same sequence number is used to identify the plurality of session set/end messages derived from a single start/end request for group communication.

9. The method of claim 8, wherein the multicasting of the connect/disconnect request message comprises repeatedly multicasting the connect/disconnect request message two or more times.

10. The method of claim 8, wherein the group communication session is managed based on a Session Initiation Protocol (SIP).

11. The method of claim 10, wherein the session set message comprises an INVITE message and the session end message comprises a BYE message.

12. The method of claim 10, wherein the connect request message comprises a Media Burst Control Protocol (MBCP) connect message and the disconnect request message comprises an MBCP disconnect message.

13. A method for operating a terminal for managing a group communication session based on a wireless access network, the method comprising:
receiving a connect/disconnect request message for setting/ending a group communication session from a Push To Talk (PTT) server; and
setting/releasing the group communication session,
wherein the connect/disconnect request message is multicasted by the PTT server that receives a plurality of session set/end messages comprising a same sequence number, and
where the same sequence number is used to identify the plurality of session set/end messages derived from a single start/end request for group communication.

14. The method of claim 13, wherein the group communication session is managed based on a Session Initiation Protocol (SIP).

15. The method of claim 14, wherein the connect request message comprises a Media Burst Control Protocol (MBCP) connect message and the disconnect request message comprises an MBCP disconnect message.

16. An apparatus of a control Push To Talk (PTT) server for managing a group communication session based on a wireless access network, the apparatus comprising:
a controller configured to, if a message requesting a plurality of reception side terminals to start/end group communication is received from a transmission side terminal, generate a plurality of session set/end messages comprising a same sequence number; and
a communication unit configured to, transmit a plurality of session set/end messages to a participating PTT server, to receive a confirm message from the participating PTT server, and to transmit a connect/disconnect request message to the transmission side terminal,
wherein the same sequence number is used to identify the plurality of session set/end messages derived from a single start/end request for group communication.

17. The apparatus of claim 16, wherein the group communication session is managed based on a Session Initiation Protocol (SIP).

18. The apparatus of claim 17, wherein the message requesting the start of the group communication comprises a REFER message.

19. The apparatus of claim 17, wherein the session set message comprises an INVITE message and the session end message comprises a BYE message.

20. The apparatus of claim 17, wherein the connect request message comprises a Media Burst Control Protocol (MBCP) connect message, and the disconnect request message comprises an MBCP disconnect message.

21. An apparatus of a participating Push To Talk (PTT) server for managing a group communication session based on a wireless access network, the apparatus comprising:
a communication unit configured to receive a plurality of session set/end messages comprising a same sequence number from a control PTT server; and
a controller configured to control to multicast a connect/disconnect request message for a plurality of reception side terminals corresponding to the plurality of session set/end messages,
wherein the sequence number is used to identify the plurality of session set/end messages derived from a single start/end request for group communication.

22. The apparatus of claim 21, wherein the controller repeatedly multicasts the connect/disconnect request message two or more times.

23. The apparatus of claim 21, wherein the group communication session is managed based on a Session Initiation Protocol (SIP).

24. The apparatus of claim 23, wherein the session set message comprises an INVITE message and the session end message comprises a BYE message.

25. The apparatus of claim 23, wherein the connect request message comprises a Media Burst Control Protocol (MBCP) connect message and the disconnect request message comprises an MBCP disconnect message.

26. An apparatus of a terminal for managing a group communication session based on a wireless access network, the apparatus comprising:
a modem configured to receive a connect/disconnect request message for setting a group communication session from a Push To Talk (PTT) server; and
a controller configured to set/release the group communication session,
wherein the connect/disconnect request message is multicasted by the PTT server that receives a plurality of session set/end messages comprising a same sequence number, and
wherein the same sequence number is used to identify the plurality of session set/end messages derived from a single start/end request for group communication.

27. The apparatus of claim 26, wherein the group communication session is managed based on a Session Initiation Protocol (SIP).

28. The apparatus of claim 27, wherein the connect request message comprises a Media Burst Control Protocol (MBCP) connect message and the disconnect request message comprises an MBCP disconnect message.

* * * * *